(12) United States Patent
Foucher et al.

(10) Patent No.: US 10,144,513 B2
(45) Date of Patent: Dec. 4, 2018

(54) HIGH DENSITY FULL FLAT BUSINESS CLASS SEAT CABIN

(71) Applicant: Zodiac Seats France, Issoudun (FR)

(72) Inventors: Benjamin Foucher, Bourges (FR); Philippe Roy, Bourges (FR)

(73) Assignee: Zodiac Seats France, Issoudun (FR)

( * ) Notice: Subject to any disclaimer, the term of this patent is extended or adjusted under 35 U.S.C. 154(b) by 177 days.

(21) Appl. No.: 14/650,018

(22) PCT Filed: Dec. 6, 2013

(86) PCT No.: PCT/IB2013/060712
§ 371 (c)(1),
(2) Date: Jun. 5, 2015

(87) PCT Pub. No.: WO2014/087387
PCT Pub. Date: Jun. 12, 2014

(65) Prior Publication Data
US 2015/0336674 A1    Nov. 26, 2015

Related U.S. Application Data

(60) Provisional application No. 61/733,974, filed on Dec. 6, 2012, provisional application No. 61/749,420, filed on Jan. 7, 2013.

(51) Int. Cl.
*B64D 11/06* (2006.01)
*B64D 11/00* (2006.01)

(52) U.S. Cl.
CPC .......... *B64D 11/0601* (2014.12); *B64D 11/06* (2013.01); *B64D 11/0604* (2014.12);
(Continued)

(58) Field of Classification Search
CPC ................................................ B64D 11/0601
See application file for complete search history.

(56) References Cited

U.S. PATENT DOCUMENTS 7,517,010 B2 * 4/2009 Saint-Jalmes .......... B64D 11/06
244/118.5
7,578,470 B2 * 8/2009 Plant ...................... B64D 11/06
244/118.6
(Continued)

FOREIGN PATENT DOCUMENTS

| | | |
|---|---|---|
| EP | 2530014 A1 | 12/2012 |
| EP | 2828163 A2 | 1/2015 |

(Continued)

OTHER PUBLICATIONS

International Patent Application No. PCT/IB2013/060712, Invitation to Pay Additional Fees and, Where Applicable; Protest Fee dated May 19, 2014.
(Continued)

*Primary Examiner* — Brian M O'Hara
(74) *Attorney, Agent, or Firm* — Kilpatrick Townsend & Stockton LLP; Dean W. Russell; Tiffany L. Williams

(57) ABSTRACT

Described are arrangements of seats, which include at least one column having rows of pairs of seats (12A,12B), each seat having a chair position and a bed position. A pair of foot wells (34A,34B) are positioned within an aft side of each row and configured to vertically align with the pair of seats in a next-aft row when the pair of seats are positioned in the bed position. The bed position of a first seat (12A) of the pair of seats is vertically offset from the bed position of a second seat (12B) of the pair of seats so that the first seat has a high bed position and the second seat has a low bed position.

17 Claims, 12 Drawing Sheets

(52) U.S. Cl.
CPC ...... *B64D 11/0606* (2014.12); *B64D 11/0641* (2014.12); *B64D 11/0646* (2014.12); *B64D 11/0647* (2014.12); *B64D 11/00* (2013.01); *B64D 2011/0046* (2013.01)

(56) References Cited

U.S. PATENT DOCUMENTS

| | | | | |
|---|---|---|---|---|
| 7,975,962 | B2* | 7/2011 | Jacob | A47C 15/00 244/118.6 |
| 8,313,060 | B2* | 11/2012 | Darbyshire | B64D 11/06 244/118.6 |
| 8,864,071 | B2* | 10/2014 | Vergnaud | B60N 2/01 244/118.6 |
| 2002/0070314 | A1* | 6/2002 | Schmidt-Schaeffer | B60N 2/01 244/118.6 |
| 2006/0097553 | A1 | 5/2006 | Spurlock et al. | |
| 2007/0102577 | A1* | 5/2007 | Saint-Jalmes | B64D 11/00 244/118.6 |
| 2007/0241232 | A1* | 10/2007 | Thompson | B64D 11/02 244/118.6 |
| 2009/0066121 | A1* | 3/2009 | Jacob | A47C 15/00 297/118 |
| 2009/0084897 | A1* | 4/2009 | Ferry | B60N 2/206 244/118.6 |
| 2009/0146004 | A1* | 6/2009 | Plant | B64D 11/06 244/118.5 |
| 2009/0166470 | A1* | 7/2009 | Dryburgh | A47C 1/0352 244/118.6 |
| 2009/0243352 | A1* | 10/2009 | Cailleteau | B64D 11/06 297/188.01 |
| 2010/0019086 | A1* | 1/2010 | Ferry | B60N 2/206 244/118.5 |
| 2010/0025530 | A1* | 2/2010 | Ferry | B60N 2/206 244/118.6 |
| 2010/0038484 | A1* | 2/2010 | Ersan | B64D 11/06 244/118.6 |
| 2010/0038485 | A1* | 2/2010 | Harcup | B64D 11/06 244/118.6 |
| 2010/0308164 | A1* | 12/2010 | McKeever | B64D 11/06 244/118.6 |
| 2011/0186682 | A1* | 8/2011 | Collins | B64D 11/06 244/118.6 |
| 2011/0309662 | A1* | 12/2011 | Veneruso | B61D 1/02 297/232 |
| 2012/0041619 | A1* | 2/2012 | Rudduck | B64D 11/00 701/3 |
| 2012/0146372 | A1* | 6/2012 | Ferry | B64D 11/06 297/232 |
| 2012/0187244 | A1* | 7/2012 | Beal | B64D 11/00 244/118.6 |
| 2012/0223186 | A1* | 9/2012 | Henshaw | B64D 11/06 244/118.6 |
| 2012/0223557 | A1* | 9/2012 | Henshaw | B64D 11/06 297/232 |
| 2012/0292957 | A1* | 11/2012 | Vergnaud | B64D 11/06 297/188.08 |
| 2012/0298798 | A1 | 11/2012 | Henshaw | |
| 2013/0105627 | A1* | 5/2013 | Orson | B64D 11/0601 244/118.5 |

FOREIGN PATENT DOCUMENTS

| | | |
|---|---|---|
| WO | 2002024527 A1 | 3/2002 |
| WO | 2012140515 A1 | 10/2012 |

OTHER PUBLICATIONS

International Patent Application No. PCT/IB2013/060712, International Search Report and Written Opinion dated Jul. 30, 2014.
Europe Patent Application No. 13817998.1, Communication Pursuant to Rules 161(1) and 162 EPC dated Oct. 31, 2014.
International Patent Application No. PCT/IB2013/060712, International Preliminary Report on Patentability dated Jun. 18, 2015.

* cited by examiner

HIGH DENSITY FULL FLAT BUSINESS CLASS SEAT CABIN

CROSS REFERENCE TO RELATED APPLICATIONS

This application is related to and claims priority benefits from U.S. Provisional Application Ser. No. 61/733,974 ("the '974 application"), filed on Dec. 6, 2012, entitled HIGH DENSITY FULL FLAT BUSINESS CLASS SEAT CABIN, and U.S. Provisional Application Ser. No. 61/749,420 ("the '420 application"), filed on Jan. 7, 2013, entitled HIGH DENSITY FULL FLAT BUSINESS CLASS SEAT CABIN. The '974 and '420 applications are hereby incorporated in their entireties by this reference.

FIELD OF THE INVENTION

The field of the invention relates to arrangements of seats and more particularly, although not necessarily exclusively, to seating arrangements within cabins of aircraft or other passenger vehicles.

BACKGROUND

Common carriers, such as passenger airlines, bus lines, and train lines, often contain multiple seats in one or more cabins. Subject to their compliance with applicable safety regulations, seating arrangements may vary from carrier to carrier. Whereas passengers may prefer fewer seats per cabin to increase leg-room, privacy, or other factors associated with decreased seat density, common carrier operators may prefer greater seats per cabin to increase revenue per transport. Optimizing, or at least enhancing, both passenger comfort and revenue generation is a significant issue in cabin design and layout.

In the case of business class cabin design, various parameters, such as passenger comfort, bed and seat dimensions, living space, direct access to the aisle, and angle of the bed surface to the cabin floor are additional considerations that influence cabin seating arrangements. For example, for passenger comfort, it is desirable to achieve a horizontal bed surface when in transport or flight. In many cases, a horizontal bed surface is achieved via a foot well that is positioned in an aft surface of the next forward passenger seat. Thus, when each passenger seat is positioned in a horizontal position, the passenger seat surface joins with the foot well to form a horizontal bed surface for the passenger.

In the case of the passenger seats that are combined with foot wells, the width and height at the bed end are critical, as well as the width and height at knee level to allow a passenger to accommodate various comfort positions, such as the ability to bend his or her knees.

Numerous seat designs have included compromises on all of these parameters in an attempt to create the highest density seating arrangements that does not significantly impair passenger comfort.

For example, U.S. Publication No. 2012/0292957 teaches the use of a pair of angled seats having a longitudinal overlap between two pairs of seats. In this design, when the seats are in the bed position, there is a vertical overlap between the foot areas of the two side-by-side beds, with one bed having a high position, and the other bed having a low position. In this design, the longitudinal axis of the seats converges toward a point located in the vertical symmetry plane of the next-forward pair of seats. Because a wide passage exists to allow passengers seated in the seat located next to the window to egress the seat, there is a body contact hazard when the seat located next to the aisle is in the bed position, thus creating a feeling of shared living space with the passenger direct neighbor in the paired seats.

As a result, it is desirable to provide a cabin seating arrangement that further maximizes the seat density for business class cabins that also provides horizontal bed arrangement while in flight, while also providing every seat with direct aisle access to eliminate the potential for body contact hazard when a person seated in a seat located next to the window egresses the seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention include an arrangement of seats for passengers of a vehicle having a cabin defining a center axis. The arrangement comprises two center columns longitudinally arranged on either side of the center axis, each center column comprising at least one next-forward row positioned forward of a next-aft row, wherein each row comprises a center seat having a chair position and a bed position, and wherein the two center columns are positioned so that the rows of each center column are substantially aligned.

The arrangement further comprises two window columns positioned on either side of the two center columns, wherein each window column is separated from an adjacent center column of the two center columns by one of two aisles, each window column comprising at least one next-forward row positioned forward of a next-aft row, wherein each row comprises a window seat having a chair position and a bed position.

The arrangement additionally comprises a foot well positioned within an aft side of the at least one next-forward row of each column and configured to vertically align with the seat in the next-aft row of each column when the seat is positioned in the bed position, wherein the bed position of each center seat in a first center column of the two center columns is vertically offset from the bed position of each center seat in a second center column of the two center columns so that each center seat in the first center column has a high bed position and each center seat in the second center column has a low bed position.

In certain embodiments, the arrangement may further comprise a center partition fixedly positioned between the center seats of the substantially aligned rows of each center column and configured to extend forward until it contacts the aft side of the at least one next-forward row of each center column. The center partition may thereby separate the center seat of the first center column from the center seat of the second center column so that no passageway exists between first center column and the second center column.

In other embodiments of the arrangement, each center seat of the two center columns comprises a longitudinal axis that forms an angle with the center axis of the cabin, wherein the angle formed by each center seat of the two center columns has a magnitude of at least approximately 35 degrees, and the angle formed by each center seat of the first center column is directionally opposite from the angle formed by each center seat of the second center column.

According to some embodiments of the arrangement, the center seat of the second center column is longitudinally offset in an aft direction from the center seat of the first center column within each of the substantially aligned rows of the two center columns to provide additional distance between an upper edge of each foot well in the second center column and a passenger's knees when the passenger is horizontally positioned on the center seat of the second center column in the low bed position. In this arrangement, the longitudinal offset creates a disymmetry between the two center bed top views.

In certain embodiments, each window seat of the two window columns comprises a longitudinal axis that forms an angle with an axis that is parallel to the center axis of the cabin, wherein the angle formed by each window seat of the two window columns has a magnitude of at least approximately 35 degrees, and the angle formed by each window seat of a first window column of the two window columns is directionally opposite from the angle formed by each window seat of a second window column of the two window columns.

In other embodiments, a first window column of the two window columns is separated from the first center column by one of the two aisles, and a second window column of the two window columns is separated from the second center column by another of the two aisles, and wherein each window seat of the first window column is generally parallel to an orientation of each center seat of the second center column, and each window seat of the second window column is generally parallel to an orientation of each center seat of the first center column.

According to certain embodiments, the bed position of each window seat in the two window columns has a height that is vertically different from a height of the chair position of each window seat in the two window columns, and the height of the bed position of each window seat in a second window column of the two window columns is vertically different from the height of the bed position of each window seat in a first window column of the two window columns. Furthermore, in these embodiments, each window seat and each center seat is configured so that a passenger's feet point away from an adjacent aisle.

DETAILED DESCRIPTION

Figure 1:
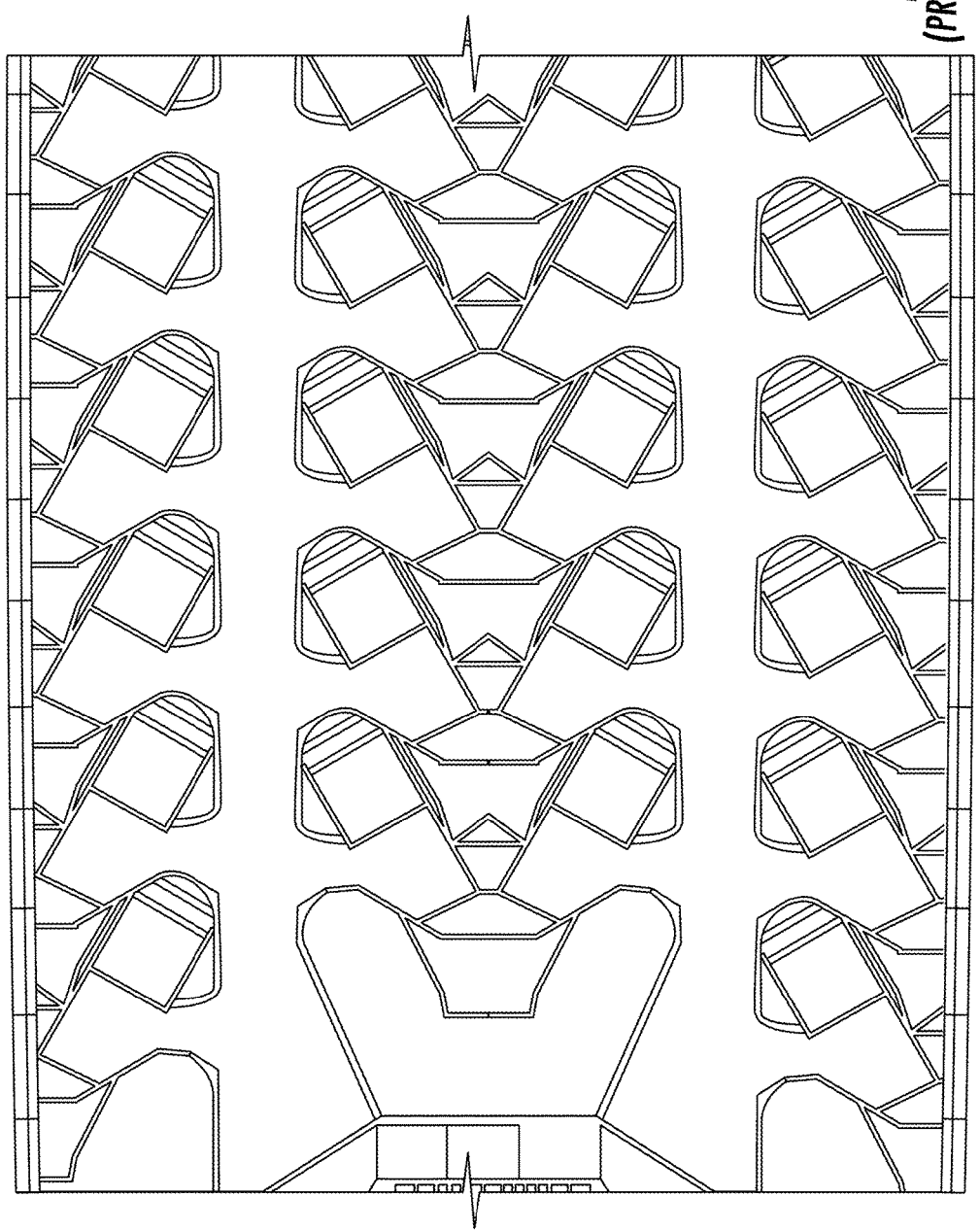
FIG. 1 is a top view of a conventional arrangement of seats in a vehicle cabin using a reverse herringbone design.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide high density seating arrangements for cabins in common carriers. While the seating arrangements are discussed for use with business class aircraft cabins, they are by no means so limited. Rather, embodiments of the seating arrangements may be used in cabins of any type or otherwise as desired.

According to certain embodiments of the present invention, as shown in FIGS. 2-12, a cabin 14 may include an arrangement 10 of a plurality of seats 12. In the arrangement 10, one or more center columns 16 may comprise at least two rows 18 of seats 12, wherein each row 18 comprises one or more center seats 12A, 12B. For example, in certain embodiments, center seats 12A, 12B are independent seat units, even though their geometry is configured to fit closely together in the arrangement 10. In these embodiments, a center column 16 of center seats 12A is positioned directly adjacent a second center column 16 of center seats 12B with no aisle 30 positioned between the center columns 16, and the two center columns 16 are longitudinally arranged on either side of a center axis C of the cabin 14.

In other embodiments, the center seats 12A, 12B may be integrally formed or connected as a double seat unit. In these embodiments, the single center column 16 is centrally located over the center axis C of the cabin 14 so that the center axis C bisects each double seat unit. From a visual perspective, there is no appreciable difference between adjacent center columns 16 and a single center column 16 comprising double seat units.

Figure 2:
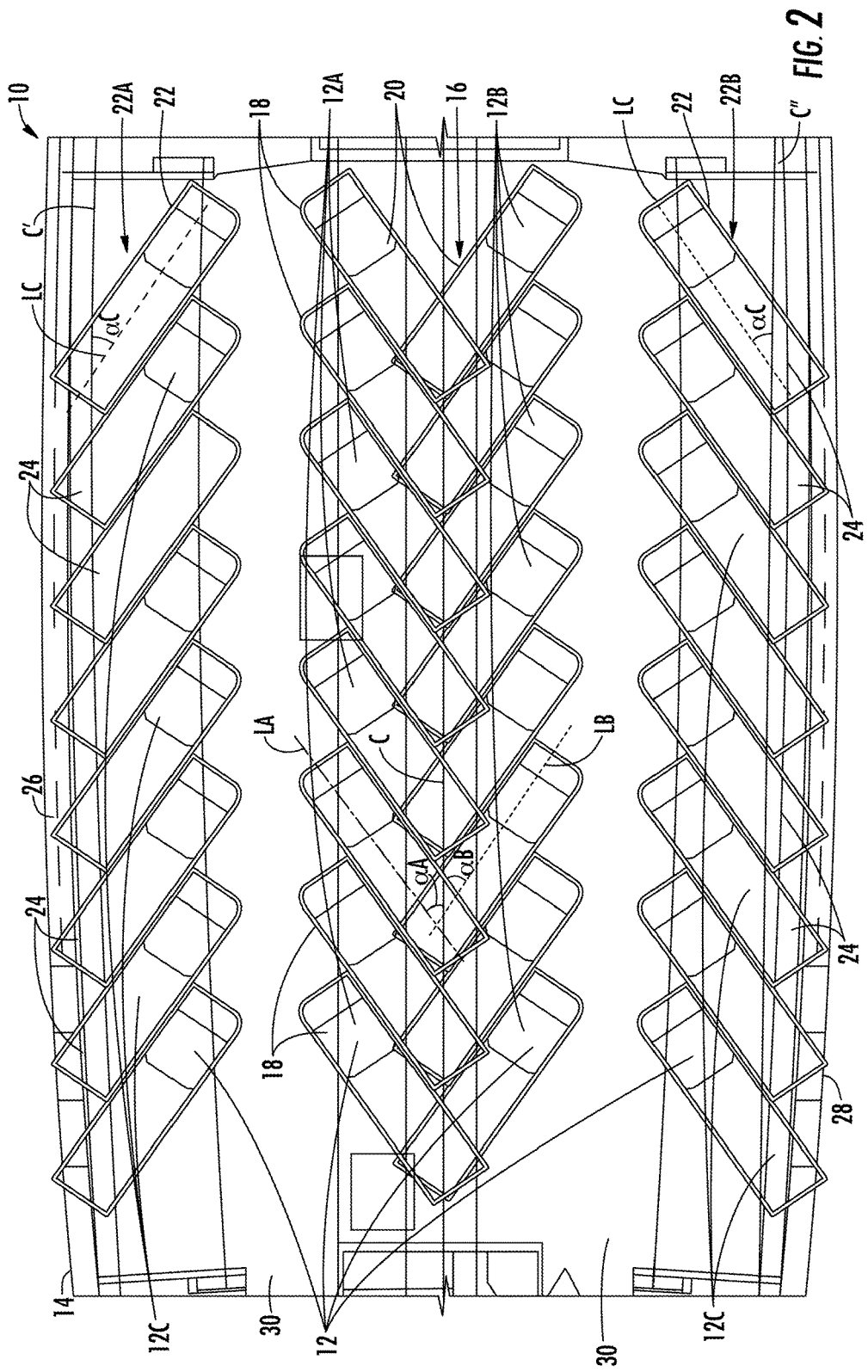
FIG. 2 is a top view of an arrangement of seats in a vehicle cabin using a reverse herringbone design combined with a vertically overlapping design, according to certain embodiments of the present invention.
Figure 3:
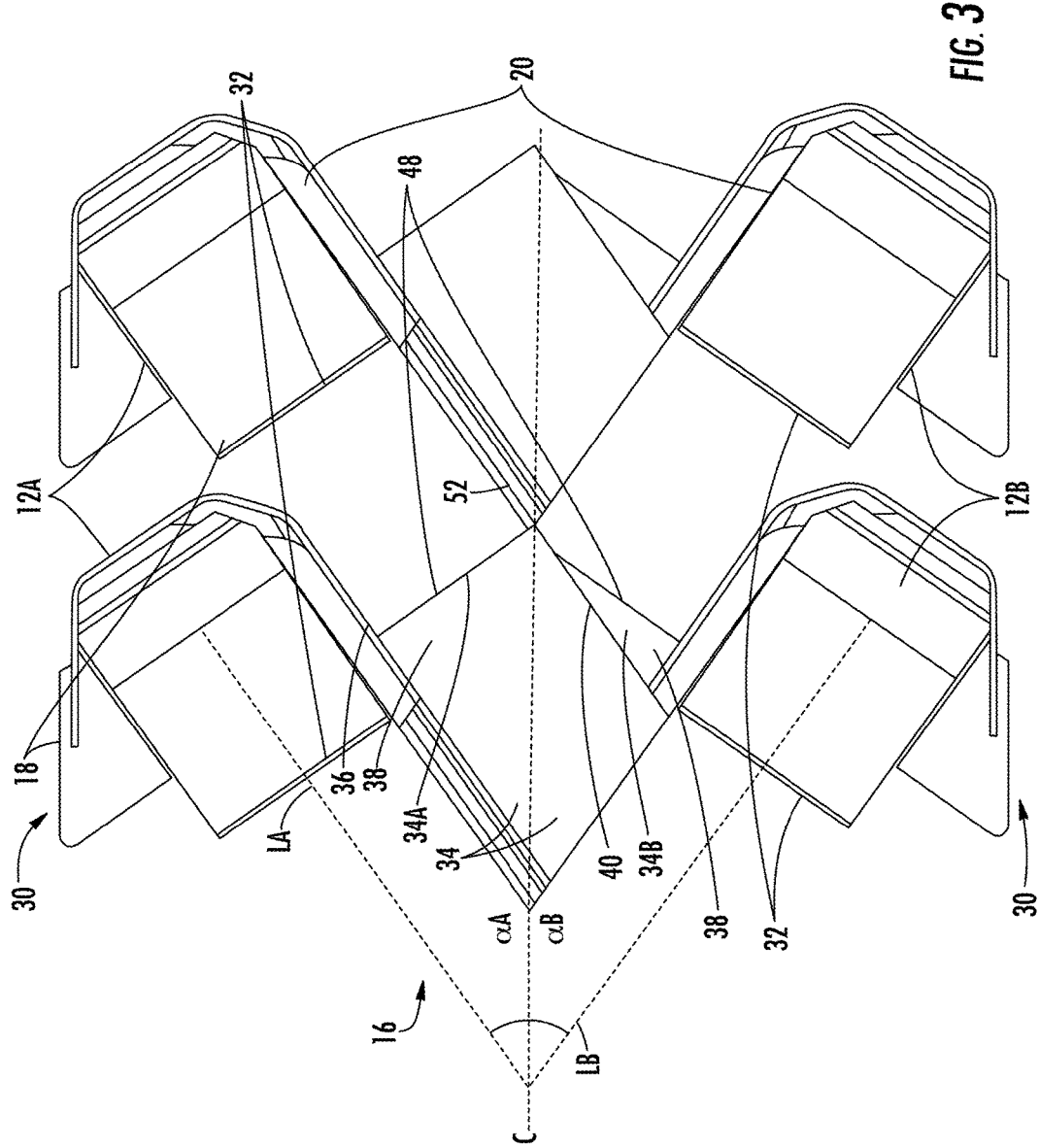
FIG. 3 is a top view of two rows of a pair of seats from the arrangement of seats in FIG. 2.
Figure 4:
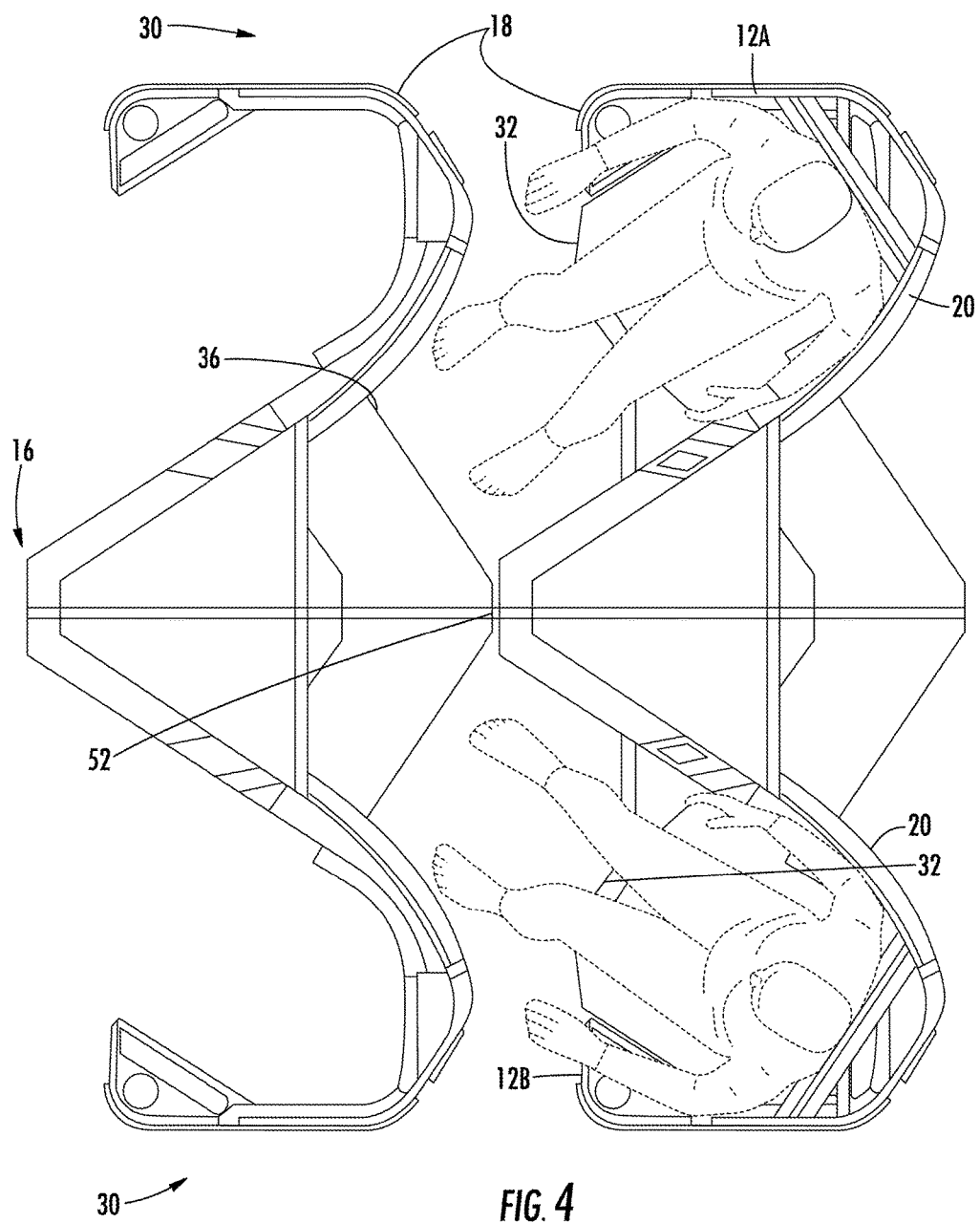
FIG. 4 is another top view of an aft side of a forward row and a next-aft row of a pair of seats from the arrangement of seats in FIG. 2.
Figure 5:
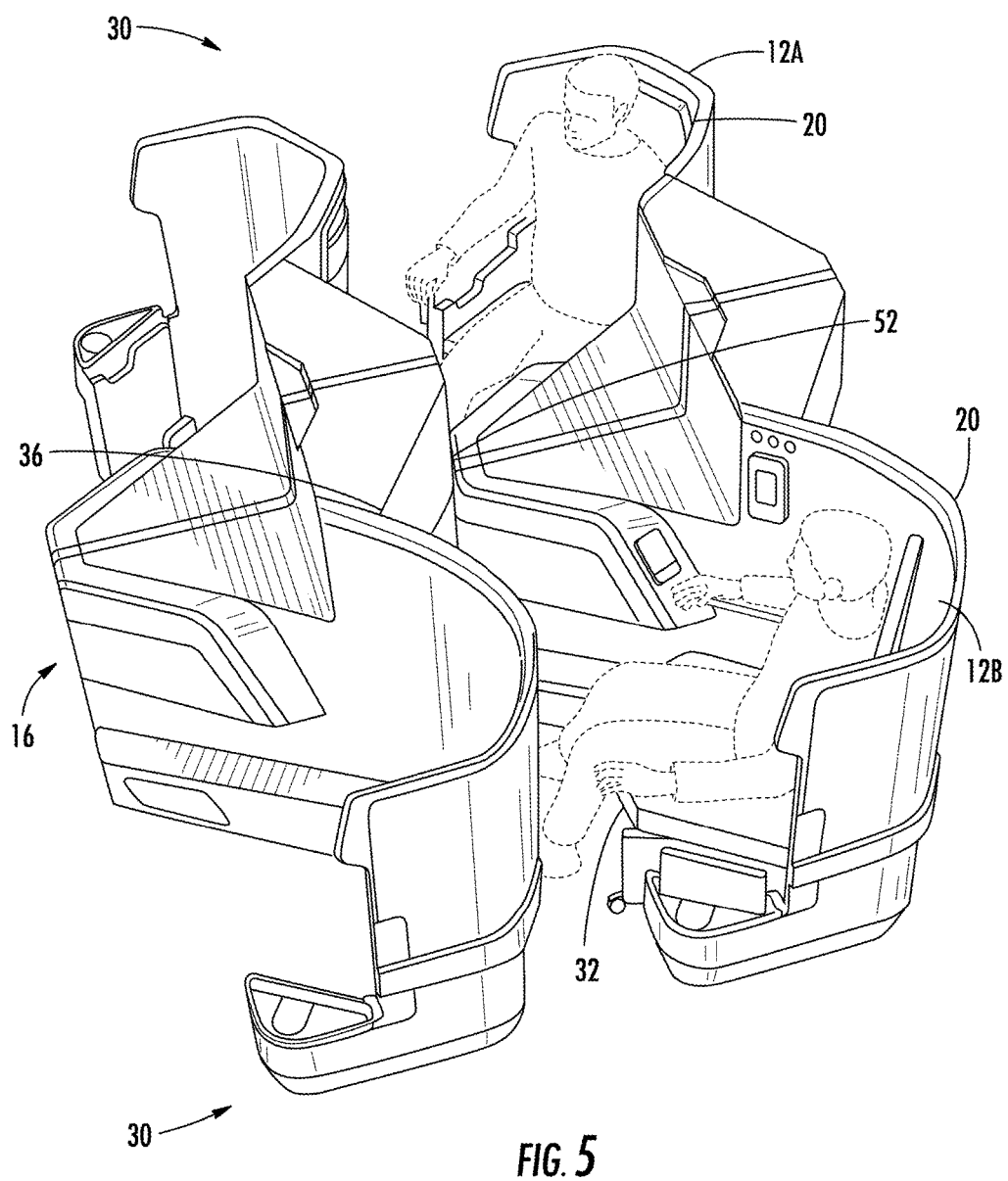
FIG. 5 is a perspective view of the pair of seats in FIG. 4, with both seats in a chair position.
Figure 6:
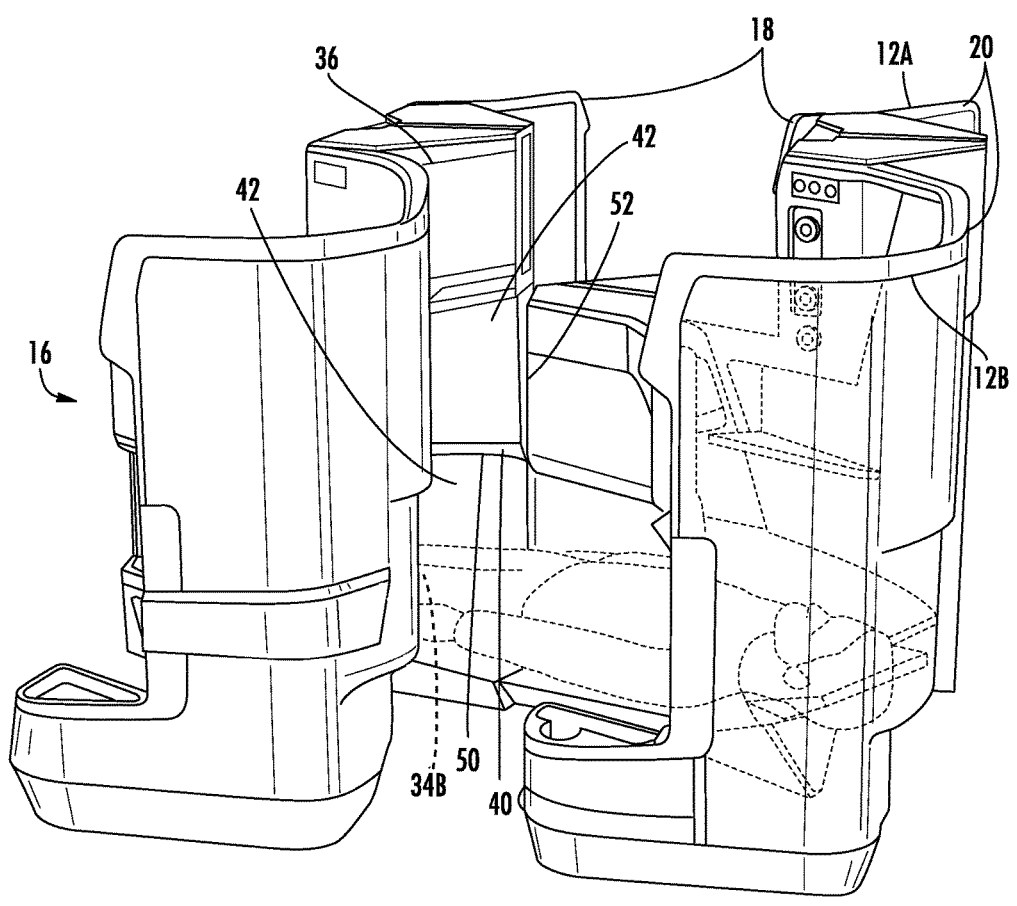
FIG. 6 is a perspective view of the pair of seats in FIG. 4, with one seat in a low bed position.
Figure 7:
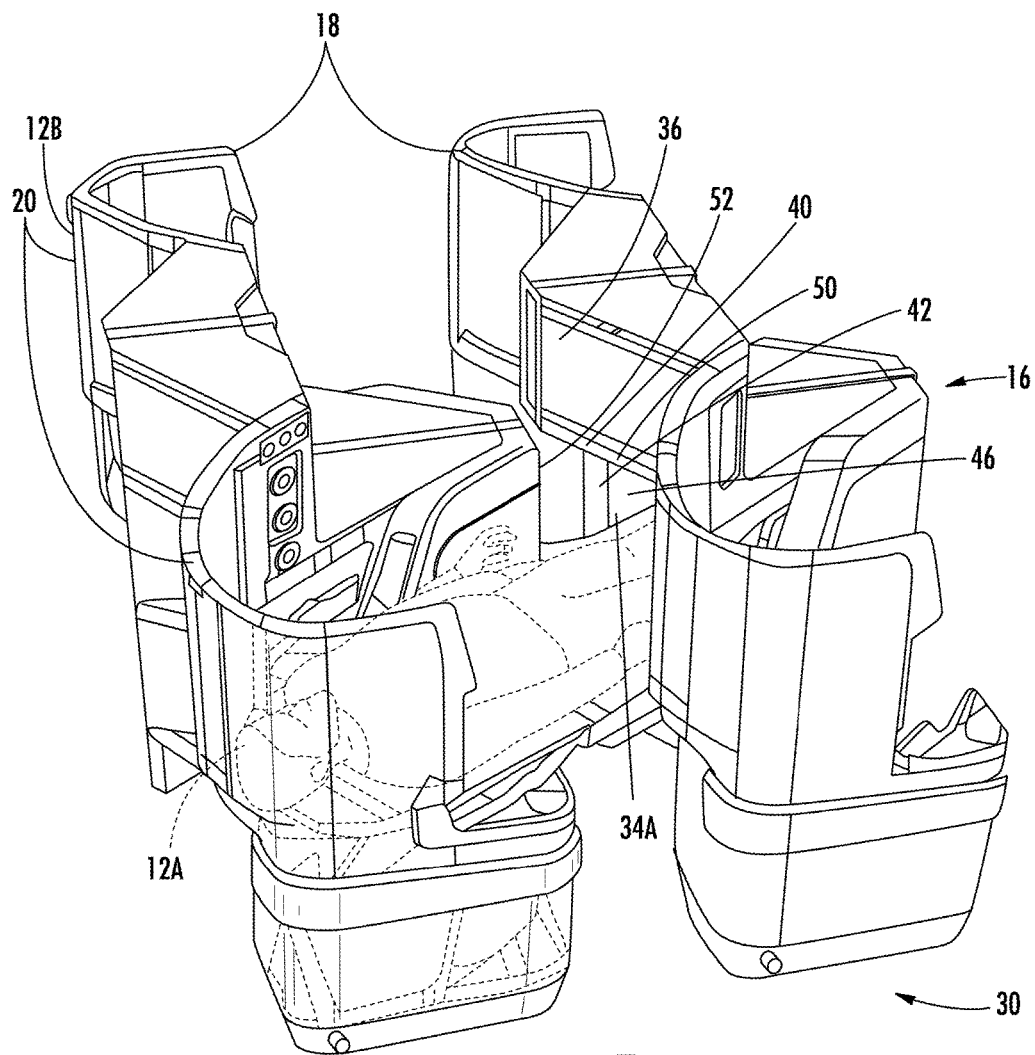
FIG. 7 is a perspective view of the pair of seats in FIG. 4, with one seat in a high bed position.
Figure 8:
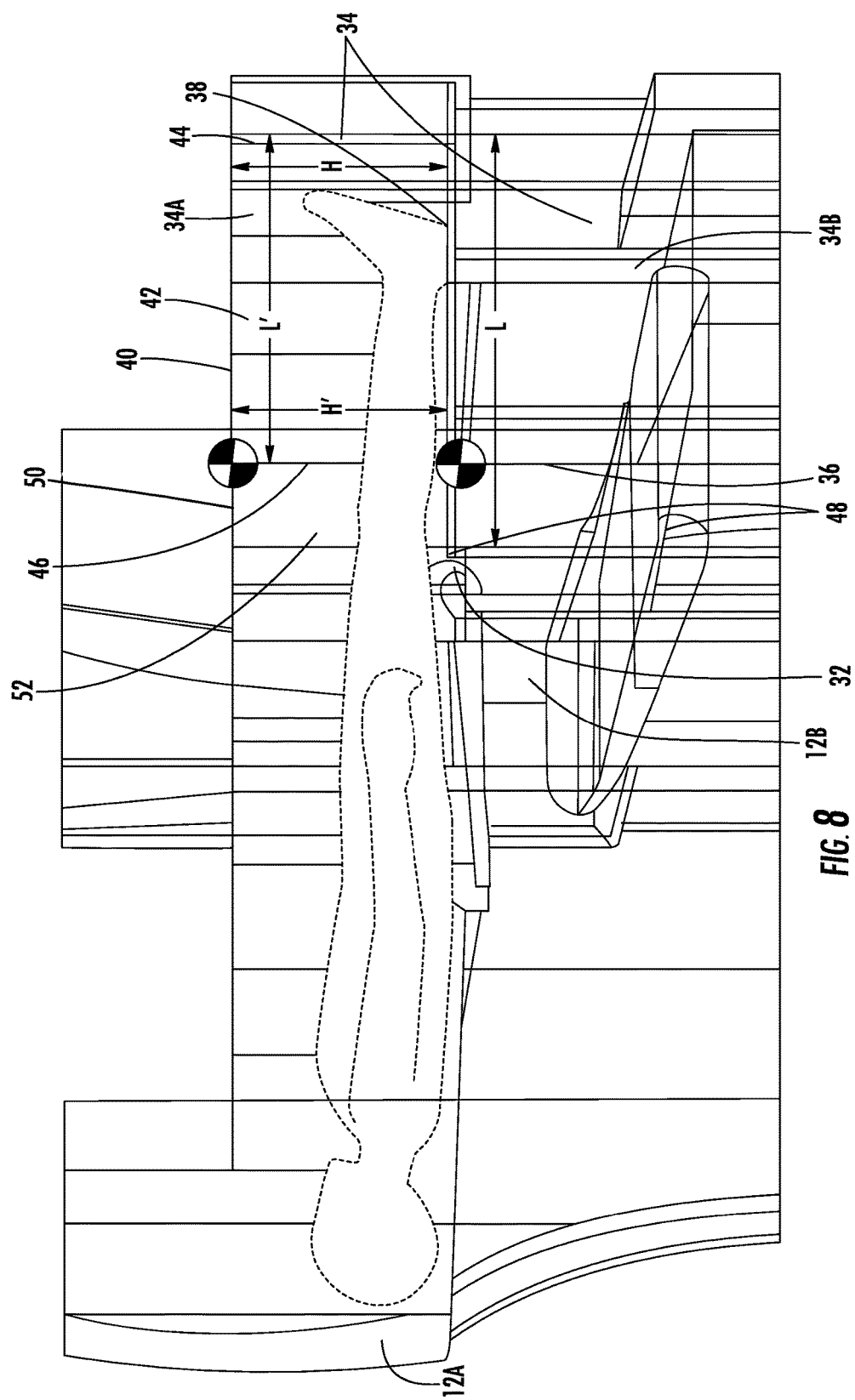
FIG. 8 is a side cross-sectional view of the pair of seats in FIG. 4, with one seat in a high bed position, and the other seat in a low bed position.
Figure 9:
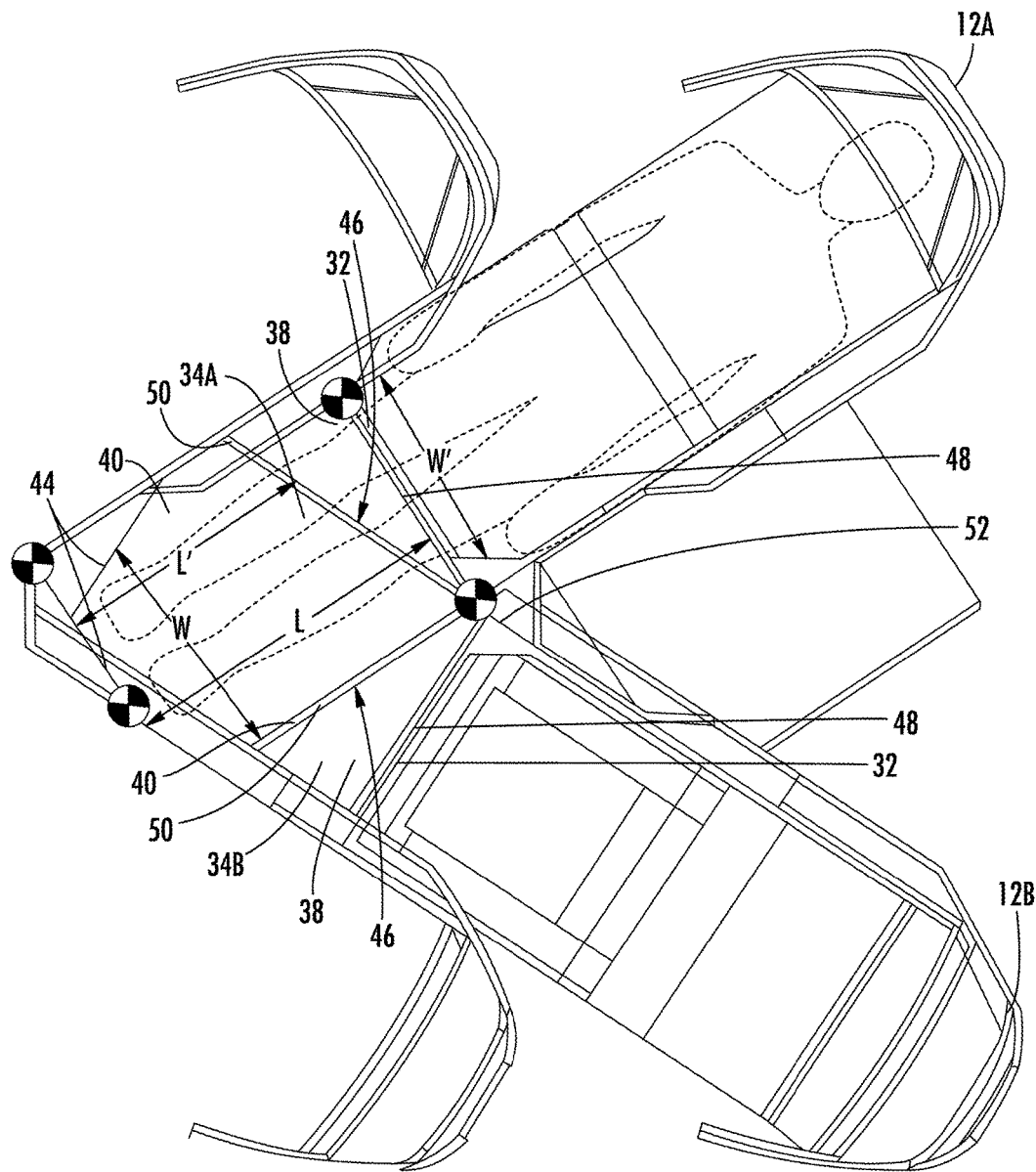
FIG. 9 is a top cross-sectional view of the pair of seats in FIG. 4, with one seat in a high bed position, and the other seat in a low bed position.
Figure 10:
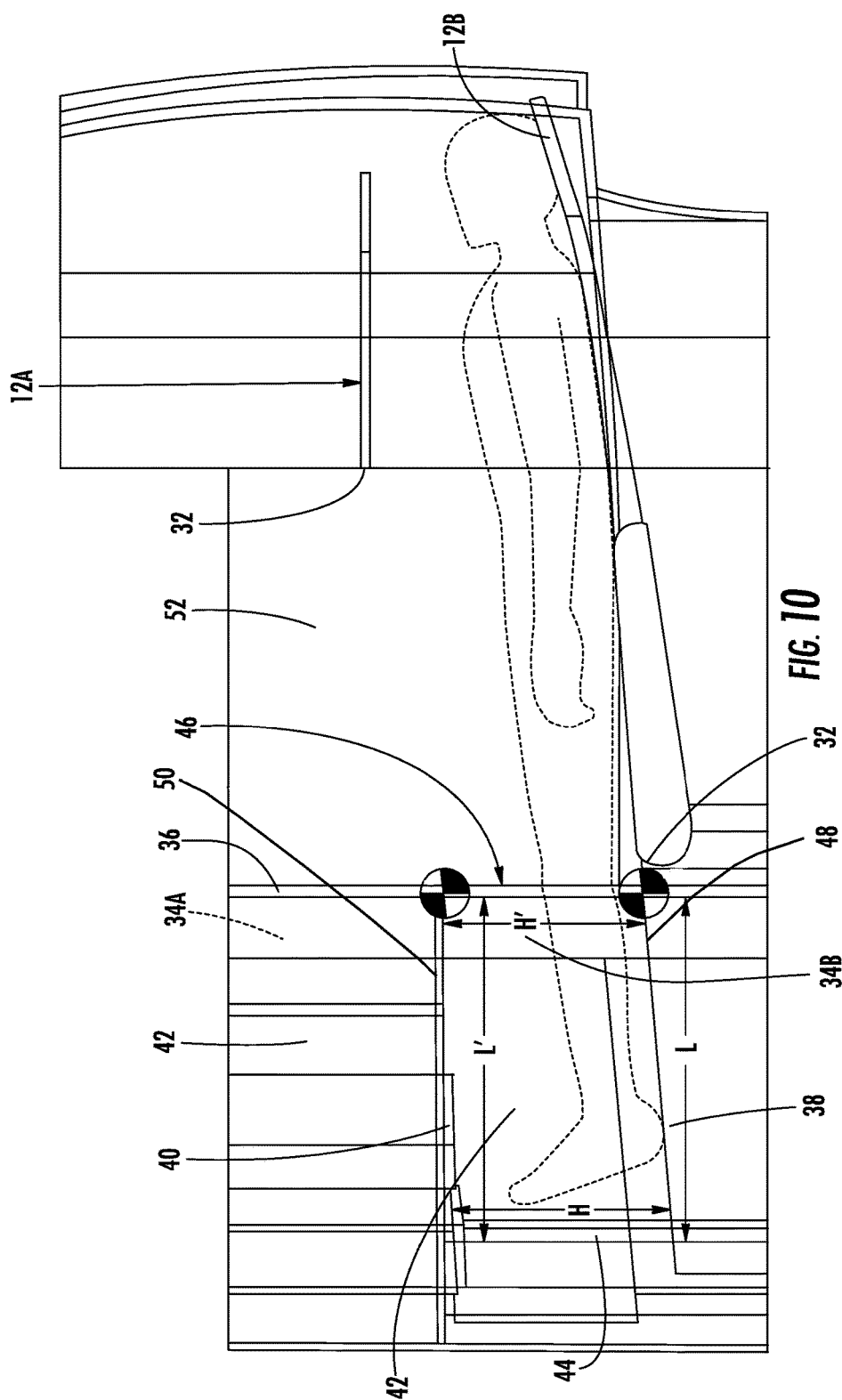
FIG. 10 is a side cross-sectional view of the pair of seats in FIG. 4, with one seat in a low bed position, and the other seat in a chair position, and a passenger lying in a horizontal position on the seat in a low bed position with his or her knees unbent.
Figure 11:
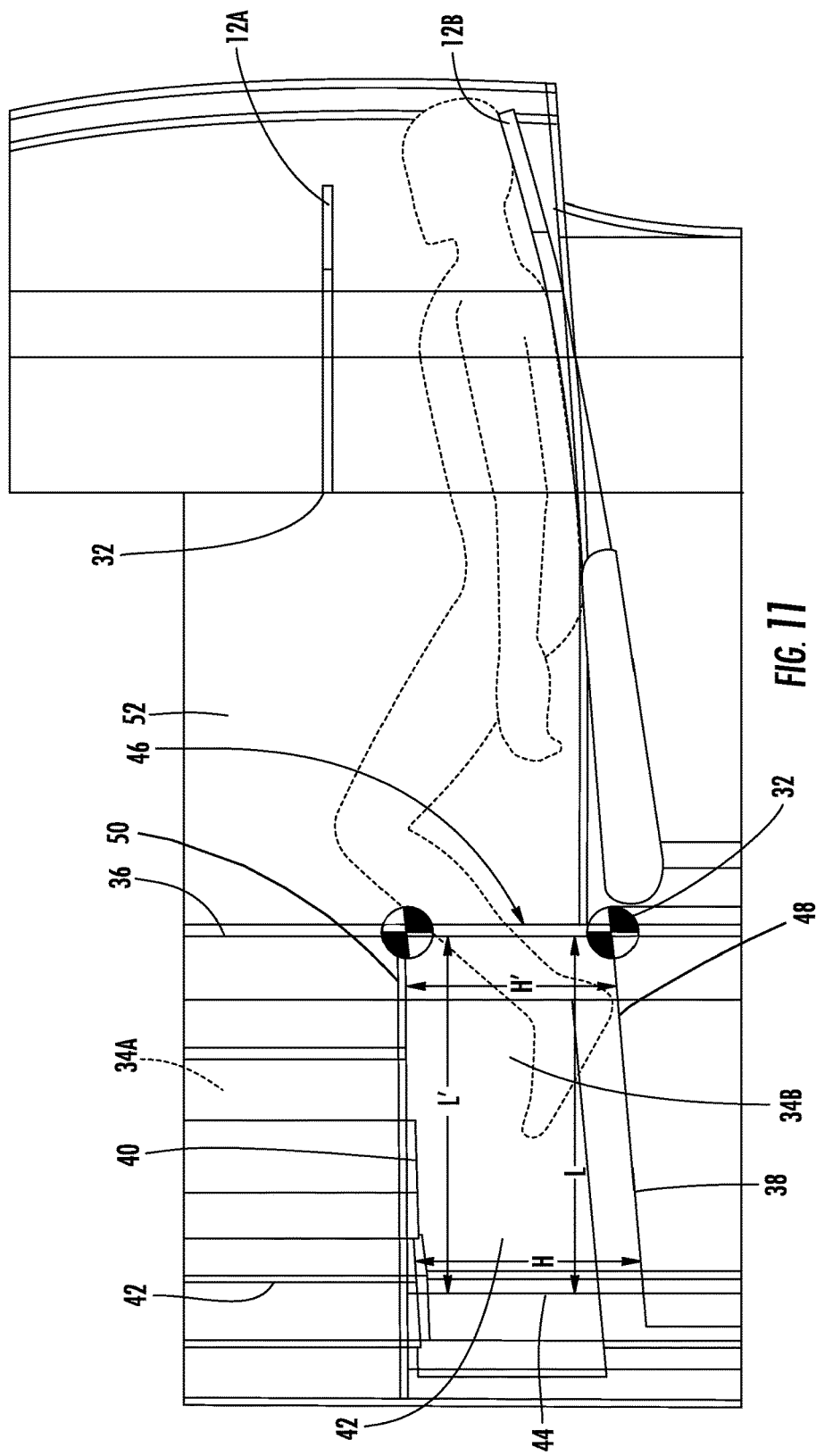
FIG. 11 is a side cross-sectional view of the pair of seats in FIG. 4, with one seat in a low bed position, and the other seat in a chair position, and a passenger lying in a horizontal position on the seat in a low bed position with his or her knees bent.
Figure 12:
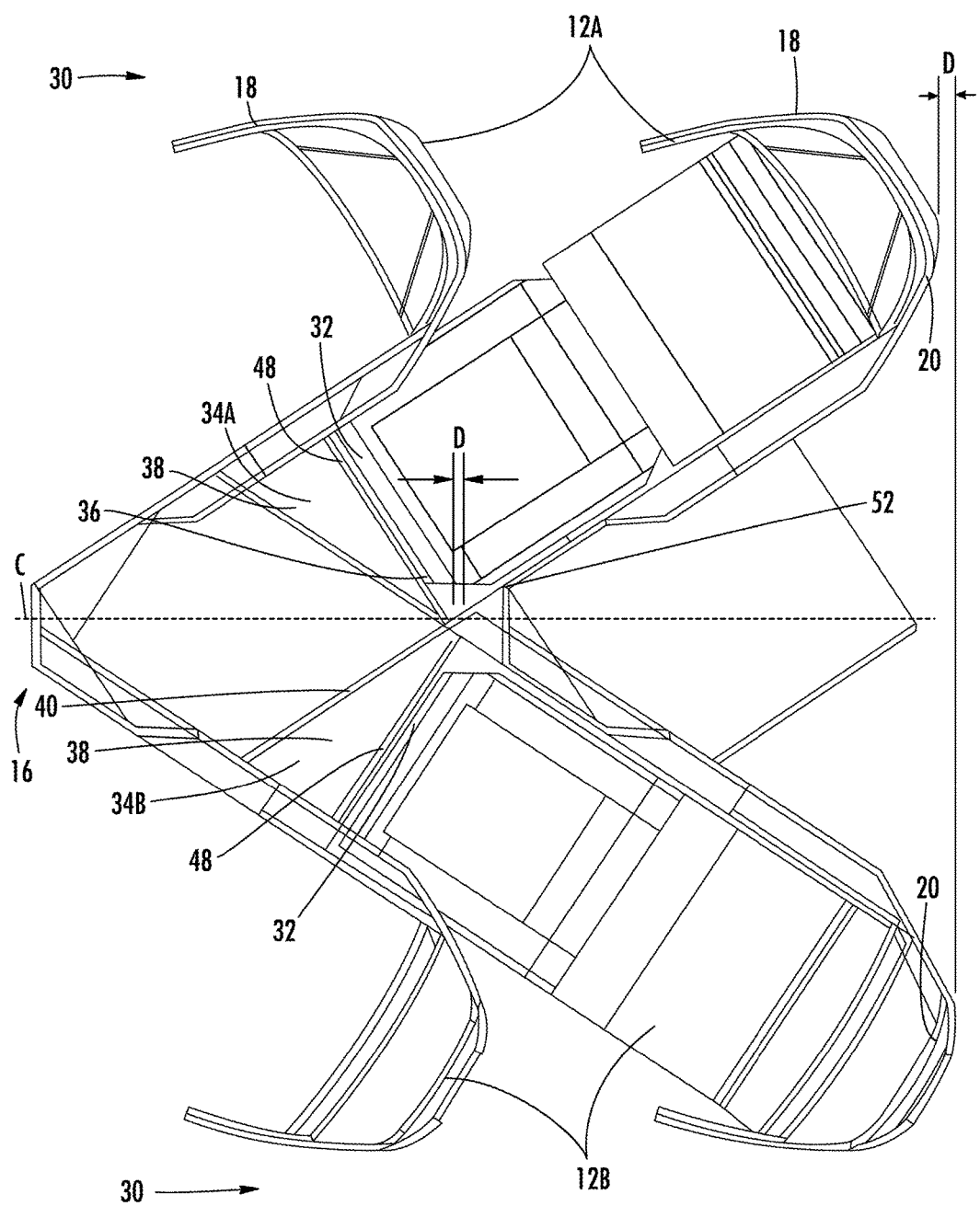
FIG. 12 is a top cross-sectional view of the pair of seats in FIG. 4, with one seat in a high bed position, and the other seat in a low bed position, and the seat in the low bed position longitudinally offset in an aft direction by a distance D.

Center seats 12A may form a longitudinal axis LA, and center seats 12B may form a longitudinal axis LB. Axis LA may form a positive angle αA with center axis C; such angle having a value of at least approximately 35 degrees, but may also range from 25 to 45 degrees. By contrast, axis LB may form an opposite (negative) angle αB with center axis C; such angle having a value of at least approximately −35 degrees, but may also range from −25 to −45 degrees. A pair 20 of adjacent center seats 12A, 12B thus forms a generally "V" shape when the center seats 12A, 12B are extended in bed positions with the feet of passengers positioned at the vertex of the "V", as shown in FIGS. 2, 9, and 12. In certain embodiments that include a longitudinal offset of the center seat 12B, as described in detail below, the longitudinal offset of center seat 12B relative to center seat 12A creates a disymmetry between the two center bed top views.

In the arrangement 10, one or more window columns 22 of window seats 12C may be positioned on either side of the one or more center columns 16, although fewer or more columns may be present as desired. In these embodiments, each window column 22 is separated from the adjacent center column 16 by an aisle 30. Similarly, each window column 22 of window seats 12C is shown as comprising rows 24 of single window seats 12C. As shown in FIG. 2, a first window column 22A of window seats 12C is arranged proximate a starboard wall 26 of the cabin 14, and a second window column 22B of window seats 12C is arranged proximate a port wall 28 of the cabin 14. The window seats 12C in the starboard window column 22A are generally parallel to the orientation of center seats 12B, and the window seats 12C in the port window column 22B are generally parallel to the orientation of center seats 12A. As a result, the seats 12A, 12B, 12C in all columns 16, 22A, 22B are oriented so that passengers seated in those seats have their feet oriented away from the aisle 30 that is adjacent to those seats, further providing a sense of privacy for passengers. The entire arrangement 10 therefore exhibits a reverse herringbone pattern (or an upside down "W" when viewed from the forward end of the cabin 14), and every center seat 12A, 12B, and every window seat 12C is positioned with direct access to one of the aisles 30.

In certain embodiments, each window seat 12C may form a longitudinal axis LC. In the case of the window seats 12C in the starboard window column 22A, the axis LC may form an opposite (negative) angle αC with respect to a line C' that is parallel to the center axis C and positioned proximate the starboard wall 26 of the cabin 14; such angle having a value of at least approximately −35 degrees, but may also range from −25 to −45 degrees.

In the case of the window seats 12C in the port window column 22B, the axis LC may form an opposite (positive) angle αC with respect to a line C" that is parallel to the center axis C and positioned proximate the port wall 28 of the cabin 14; such angle having a value of at least approximately 35 degrees, but may also range from 25 to 45 degrees.

Within the arrangement 10, each seat 12 (A, B, and C) may be an individual seat unit having its own seat track attachment system, even for the center seats 12A, 12B, for which the side counter tops and foot wells 34A, 34B have an overlapping arrangement. In other words, every seat 12 (A, B, and C) may be an independent seat unit, even though their geometry is configured to fit closely together in the arrangement 10.

As compared to a conventional arrangement 10 as shown in FIG. 1, a high density of seats 12 is achieved in the arrangement 10 by reducing the pitch (i.e., distance) between the rows 18 of center seats 12A, 12B, and rotating the position of each center seat 12A, 12B to increase the magnitude of the angles αA, αB relative to the center line C, as shown in FIG. 2. In certain embodiments, the angle αC of each window seat 12C may also be increased to reduce the pitch (i.e., distance) between the rows 24. Furthermore, the magnitude of the angles αC may be the same, greater than, or less than the angles αA, αB of the center seats 12A, 12B. According to certain embodiments, the goal is to provide a similar angle αA, αB, αC for all seats 12 (A, B, and C) in the center column 16 and the window columns 22A, 22B so as to provide a generally symmetrical reverse herringbone pattern for the arrangement 10.

According to certain embodiments, each seat 12 is configured to convert from an upright or reclined chair position to a horizontal position, also commonly referred to as a bed position, as shown in FIGS. 6-12. Because the length of the seat 12 in the bed position is not long enough for a passenger to lie down in a horizontal position, a forward edge 32 of each seat 12 in the bed position is configured to be positioned proximate a foot well 34 that is positioned within an aft side 36 of the next-forward seat 12. A lower surface 38 of the foot well 34 is configured to align with the seat 12 when the seat 12 is in the bed position, as shown in FIGS. 8-12. As a result, the combined seat 12 in the bed position and the foot well 34 provide a comfortable sleeping length for a passenger to lie down in a horizontal position.

In addition to the lower surface 38 discussed above, each foot well 34 also comprises an upper surface 40 and side surfaces 42. A forward end of each foot well 34 is enclosed by a forward surface 44. As best illustrated in FIGS. 8-11, the foot well 34 comprises a width W and a height H that corresponds to the dimensions of the forward surface 44. The foot well 34 also comprises an opening 46 comprising a width W' and a height H'. The width W' of the opening 46 may be the same, smaller, or larger than the width W of the forward surface 44. Likewise, the height H' of the opening 46 may be the same, smaller, or larger than the height H of the forward surface 44.

As shown in FIGS. 8-11, the lower surface 38 of the foot well 34 has a length L that spans the distance from the forward surface 44 to a lower edge 48 that is positioned proximate the forward edge 32 of the seat 12 when the seat is in the bed position. The upper surface 40 of the foot well 34 has a length L' that spans the distance from the forward surface 44 to an upper edge 50 of the opening 46.

To provide each passenger with a comfortable experience when the seat 12 is in the bed position, minimum values of the width W, the height H, the width W', and the height H' of each foot well 34 are necessary to allow a passenger to bend his or her knees when lying down on the seat 12 in the bed position. In certain embodiments, for having a comfortable sleeping experience, W may range from 10 to 15 inches, and W' may range from 12 to 25 inches.

The minimum height H' of the opening 46 that is required for a passenger to bend his or her knees when horizontally positioned on the seat 12 in the bed position is also dependent on the length L' of the upper surface 40 of the foot well 34. In other words, as the length L' of the upper surface 40 increases, the upper edge 50 is positioned closer to the location of the passenger's knees when the passenger is horizontally positioned on the seat 12 in the bed position, which increases the minimum height H' (or clearance) of the opening 46 required for the passenger to bend his or her knees.

To accommodate the decreased distance between rows 18 of center seats 12A, 12B without reducing the bed dimensions, the foot wells 34A, 34B associated with center seats 12A, 12B in each row 18 are arranged in a vertically overlapping design. In certain embodiments, to allow the passenger seated in each center seat 12A, 12B to access the corresponding foot well 34A, 34B, each center seat 12A has a high bed position that is aligned with the upper foot well 34A, and each center seat 12B has a low bed position that is aligned with the lower foot well 34B. In some embodiments, the difference between the height of the high bed position and the low bed position is not less than 10 inches, and may range from 13 to 15 inches. By providing a suitable height difference that is not too large, the sleeping experience between the two center seats 12A, 12B is balanced so that one seat is not too low, and the other seat is not too high. While center seat 12A is described as having the high bed position and center seat 12B is described as having the low bed position, a person of ordinary skill in the relevant art will understand that the arrangement may be reversed as needed to achieve the desired density of the arrangement 10.

The difference in height between the low bed position of center seat 12B and the high bed position of center seat 12A is designed to create a sufficiently sized foot well 34A, 34B for each center seat 12A, 12B in the bed position. As a result, the vertical overlap of the foot wells 34A, 34B increases the density of the arrangement 10 without appreciable loss of bed dimensions and, in certain embodiments, with no loss of bed dimensions.

The vertical location of the bed position in the window seats 12C may be the same height as the height associated with a Taxi, Take-off, and Landing or "TTL" position for passenger seats, or may have a high bed position or low bed position as described above with respect to center seats 12A, 12B. The vertical height of the bed position of the window seats 12C may be adjusted as needed or desired for cabin 14 symmetry or for harmonization of passenger experience.

In certain embodiments, when in the upright or reclined chair positions, the center seats 12A, 12B are positioned at the height associated with the TTL position. Thus, to convert the center seats 12A, 12B between the upright or reclined chair position and the bed position, the center seat 12A is raised from the height of the TTL position to the height of the high bed position (and vice versa), and the center seat 12B is lowered from the height of the TTL position to the height of the low bed position (and vice versa). Similar vertical movements may be required to convert the window seats 12C between the upright or reclined chair position and the bed position, depending on whether the window seats 12C remain at the height of the TTL position when in the bed position, or whether the window seats 12C have a bed position that is a high bed position or a low bed position. These movements of the seats 12A, 12B, and/or 12C may be performed by any mechanical or electronic device having a configuration that allows for the desired movements described above, including but not limited to electronic actuators and gas springs.

In the case of the upper foot well 34A, the vertically overlapping foot well design does not pose any additional limitations as to the shape or dimensions of the foot well 34A. Thus, the length L' of the upper surface 40 may have any suitable length that positions the upper edge 50 of the opening 46 sufficiently away from the location of the passenger's knees when the passenger is horizontally positioned on the seat 12 in the bed position to allow comfortable knee bending.

However, in the case of the lower foot well 34B, the length L' of the upper surface 40 is determined by the width of lower surface 38 of the upper foot well 34A because the structure that forms the upper surface 40 of the lower foot well 34B also forms the lower surface 38 of the upper foot well 34A. Since the length L' of the upper surface 40 of the lower foot well 34B may not be altered without affecting the width of the upper foot well 34A, and the height H' of the opening 46 of the lower foot well 34B is also constrained by the difference between the high bed position of center seat 12A and the low bed position of center seat 12B, the options are limited for altering the lower foot well 34B to (1) move the upper edge 50 of the upper surface 40 away from the location of the passenger's knees when the passenger is horizontally positioned on the seat 12 in the bed and/or to (2) increase the height H' of the opening 46 to allow for greater clearance for knee bending.

To accommodate additional constraints imposed on the design of the lower foot well 34B by the vertically overlapping foot well design, in certain embodiments as shown in FIG. 12, each center seat 12B may be longitudinally offset by a distance D that places the location of each center seat 12B slightly farther aft of the center seat 12A with which the center seat 12B is paired. In certain embodiments, the distance D may be approximately 1 inch, but may be up to a few inches or less than one inch if required by the overall cabin layout. According to these embodiments, the distance D is not a large enough value to create any loss of seat density in the arrangement 10. In this arrangement, the longitudinal offset by the distance D of the center seat 12B creates a disymmetry between the two center bed top views.

The distance D by which each center seat 12B is longitudinally offset relative to the adjacent center seat 12A translates directly into the same amount of additional distance between the upper edge 50 of the opening 46 of the lower foot well 34B and the location of the passenger's knees when the passenger is horizontally positioned on the center seat 12B in the low bed position. The distance D therefore compensates for the fact that the dimensions of the height H' of the opening 46 and the length L' of the upper surface 40 of the lower foot well 34B are constrained by the overlapping foot well design. As a result, passengers that are horizontally positioned in center seats 12A, 12B may have substantially the same amount of room to bend their knees.

With respect to the center seats 12A, 12B, no passageway is needed between the two center seats 12A, 12B, as each seat has its own direct access to the adjacent aisle 30. Thus, as shown in FIGS. 3-12, a center partition 52 is positioned between the two center seats 12A, 12B of the two center columns 16 (or between the center seats 12A, 12B of a double seat unit), which is configured to extend forward until it contacts the aft side 36 of the next forward row 18 of each center column 16. The center partition 52 therefore separates center seat 12A from the center seat 12B so that no passageway exists between the first center column 16 and the second center column 16 (or through the rows 18 from one aisle 30 to the opposite aisle 30 of a single center column 16 that comprises double seat units in each row 18). Thus, the only path of egress for a passenger seated in one of the center seats 12A, 12B is via the aisle 30 that is immediately adjacent the passenger's seat because the center partition 52 blocks a passenger from accessing the aisle 30 that is located on the opposing side of the center columns 16.

As a result, the center partition 52 prevents any body contact between passengers when the center seats 12A, 12B are in the bed position, as well as preventing the possibility that one passenger is able to see the body of his or her neighbor when in the bed position. The center partition 52 therefore clearly defines the personal space for each center seat 12A, 12B, without giving a passenger the feeling that he or she is sharing some space with his or her neighbor.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An arrangement of seats for passengers of a vehicle having a cabin defining a center axis, the arrangement comprising:
   (a) two center columns longitudinally arranged on either side of the center axis, each center column comprising at least one next-forward center row positioned forward of a next-aft center row, wherein each center row comprises a center seat having a chair position and a bed position, and wherein the two center columns are positioned so that the center rows of each center column are substantially aligned;
   (b) two window columns positioned on either side of the two center columns, wherein each window column is separated from an adjacent center column of the two center columns by one of two aisles, each window column comprising at least one next-forward window row positioned forward of a next-aft window row, wherein each window row is comprised of a singular seat positioned adjacent to an exterior window, each window seat having a chair position and a bed position, wherein each window seat and each center seat is arranged so that a passenger's feet point away from an adjacent aisle when the passenger is seated in the seat;
   (c) a foot well positioned within an aft side of the seat in the at least one next-forward center row of each center column and vertically aligned with the seat in the next-aft center row of each center column when the seat is positioned in the bed position;
   (d) wherein the bed position of each center seat in a first center column of the two center columns is vertically offset from the bed position of each center seat in a second center column of the two center columns so that each center seat in the first center column has a high bed position and each center seat in the second center column has a low bed position; and
   (e) a center partition fixedly positioned between the center seats of the substantially aligned center rows of each center column and extended forward until it contacts the aft side of the at least one next-forward center row of each center column, thereby separating the center seat of the first center column from the center seat of the second center column so that no passageway exists between first center column and the second center column.

2. The arrangement of seats of claim 1, wherein each center seat of the two center columns comprises a longitudinal axis that forms an angle with the center axis of the cabin, wherein the angle formed by each center seat of the two center columns has a magnitude of at least approximately 35 degrees, and the angle formed by each center seat of the first center column is directionally opposite from the angle formed by each center seat of the second center column.

3. The arrangement of seats of claim 1, wherein the center seat of the second center column is longitudinally offset in an aft direction from the center seat of the first center column within each of the substantially aligned center rows of the two center columns to provide additional distance between an upper edge of each foot well in the second center column and a passenger's knees when the passenger is horizontally positioned on the center seat of the second center column in the low bed position.

4. The arrangement of seats of claim 1, wherein each window seat of the two window columns comprises a longitudinal axis that forms an angle with an axis that is parallel to the center axis of the cabin, wherein the angle formed by each window seat of the two window columns has a magnitude of at least approximately 35 degrees, and the angle formed by each window seat of a first window column of the two window columns is directionally opposite from the angle formed by each window seat of a second window column of the two window columns.

5. The arrangement of seats of claim 1, wherein a first window column of the two window columns is separated from the first center column by one of the two aisles, and a second window column of the two window columns is separated from the second center column by another of the two aisles, and wherein each window seat of the first window column is generally parallel to an orientation of each center seat of the second center column, and each window seat of the second window column is generally parallel to an orientation of each center seat of the first center column.

6. The arrangement of seats of claim 1, wherein the bed position of each window seat in the two window columns has a height that is vertically different from a height of the chair position of each window seat in the two window columns, and the height of the bed position of each window seat in a second window column of the two window columns is vertically different from the height of the bed position of each window seat in a first window column of the two window columns.

7. An arrangement of seats for passengers of a vehicle having a cabin defining a center axis, the arrangement comprising:
   (a) two center columns longitudinally arranged on either side of the center axis, each center column comprising at least one next-forward center row positioned forward of a next-aft center row, wherein each center row comprises a center seat having a chair position and a bed position, and wherein the two center columns are positioned so that the center rows of each center column are substantially aligned;
   (b) two window columns positioned on either side of the two center columns, wherein each window column is separated from an adjacent center column of the two center columns by one of two aisles, each window column comprising at least one next-forward window row positioned forward of a next-aft window row, wherein each window row is comprised of a singular seat positioned adjacent to an exterior window, each window seat having a chair position and a bed position, wherein each window seat and each center seat is arranged so that a passenger's feet point away from an adjacent aisle when the passenger is seated in the seat;

(c) wherein each center seat of the two center columns comprises a longitudinal axis that forms an angle with the center axis of the cabin, wherein the angle formed by each center seat of the two center columns has a magnitude of at least approximately 35 degrees, and the angle formed by each center seat of the first center column is directionally opposite from the angle formed by each center seat of the second center column;

(d) a foot well positioned within an aft side of the seat in the at least one next-forward center row of each center column and vertically aligned with the seat in the next-aft center row of each center column when the seat is positioned in the bed position;

(e) wherein the bed position of each center seat in a first center column of the two center columns is vertically offset from the bed position of each center seat in a second center column of the two center columns so that each center seat in the first center column has a high bed position and each center seat in the second center column has a low bed position; and (f) a center partition fixedly positioned between the center seats of the substantially aligned center rows of each center column and extended forward until it contacts the aft side of the at least one next-forward center row of each center column.

8. The arrangement of seats of claim 7, wherein each window seat of the two window columns comprises a longitudinal axis that forms an angle with an axis that is parallel to the center axis of the cabin, wherein the angle formed by each window seat of the two window columns has a magnitude of at least approximately 35 degrees, and the angle formed by each window seat of a first window column of the two window columns is directionally opposite from the angle formed by each window seat of a second window column of the two window columns.

9. The arrangement of seats of claim 7, wherein a first window column of the two window columns is separated from the first center column by one of the two aisles, and a second window column of the two window columns is separated from the second center column by another of the two aisles, and wherein each window seat of the first window column is generally parallel to an orientation of each center seat of the second center column, and each window seat of the second window column is generally parallel to an orientation of each center seat of the first center column.

10. The arrangement of seats of claim 7, wherein the bed position of each window seat in the two window columns has a height that is vertically different from a height of the chair position of each window seat in the two window columns.

11. The arrangement of seats of claim 10, wherein the height of the bed position of each window seat in a second window column of the two window columns is vertically different from the height of the bed position of each window seat in a first window column of the two window columns.

12. An arrangement of seats for passengers of a vehicle having a cabin defining a center axis, the arrangement comprising:

(a) two center columns longitudinally arranged on either side of the center axis, each center column comprising at least one next-forward center row positioned forward of a next-aft center row, wherein each center row comprises a center seat having a chair position and a bed position, and wherein the two center columns are positioned so that the center rows of each center column are substantially aligned;

(b) two window columns positioned on either side of the two center columns, wherein each window column is separated from an adjacent center column of the two center columns by one of two aisles, each window column comprising at least one next-forward window row positioned forward of a next-aft window row, wherein each window row is comprised of a singular seat positioned adjacent to an exterior window, each window seat having a chair position and a bed position, wherein each window seat and each center seat is arranged so that a passenger's feet point away from an adjacent aisle when the passenger is seated in the seat;

(c) wherein each center seat of the two center columns comprises a longitudinal axis that forms an angle with the center axis of the cabin, wherein the angle formed by each center seat of the two center columns has a magnitude of at least approximately 35 degrees, and the angle formed by each center seat of the first center column is directionally opposite from the angle formed by each center seats of the second center column;

(d) a foot well positioned within an aft side of the seat of the at least one next-forward center row of each center column and vertically aligned with the seat in the next-aft center row of each center column when the seat is positioned in the bed position;

(e) wherein the bed position of each center seat in a first center column of the two center columns is vertically offset from the bed position of each center seat in a second center column of the two center columns so that each center seat in the first center column has a high bed position and each center seat in the second center column has a low bed position; and (f) wherein the center seat of the second center column is longitudinally offset in an aft direction from the center seat of the first center column within each of the substantially aligned center rows of the two center columns to provide additional distance between an upper edge of each foot well in the second center column and a passenger's knees when the passenger is horizontally positioned on the center seat of the second center column in the low bed position.

13. The arrangement of seats of claim 12, further comprising a center partition fixedly positioned between the center seats of the substantially aligned center rows of each center column and extended forward until it contacts the aft side of the at least one next-forward center row of each center column, thereby separating the center seat of the first center column from the center seat of the second center column so that no passageway exists between first center column and the second center column.

14. The arrangement of seats of claim 12, wherein each window seat of the two window columns comprises a longitudinal axis that forms an angle with an axis that is parallel to the center axis of the cabin, wherein the angle formed by each window seat of the two window columns has a magnitude of at least approximately 35 degrees, and the angle formed by each window seat of a first window column of the two window columns is directionally opposite from the angle formed by each window seat of a second window column of the two window columns.

15. The arrangement of seats of claim 12, wherein a first window column of the two window columns is separated from the first center column by one of the two aisles, and a second window column of the two window columns is separated from the second center column by another of the two aisles, and wherein each window seat of the first window column is generally parallel to an orientation of each center seat of the second center column, and each window seat of the second window column is generally parallel to an orientation of each center seat of the first center column.

16. The arrangement of seats of claim 12, wherein the bed position of each window seat in the two window columns has a height that is vertically different from a height of the chair position of each window seat in the two window columns.

17. The arrangement of seats of claim 16, wherein the height of the bed position of each window seat in a second window column of the two window columns is vertically different from the height of the bed position of each window seat in a first window column of the two window columns.

* * * * *